(12) United States Patent
Perez

(10) Patent No.: US 10,268,792 B2
(45) Date of Patent: Apr. 23, 2019

(54) DESIGNING A DENSITY DRIVEN INTEGRATED CIRCUIT

(71) Applicant: Freescale Semiconductor, Inc., Austin, TX (US)

(72) Inventor: Julia Perez, Tempe, AZ (US)

(73) Assignee: NXP USA, INC., Austin, TX (US)

( * ) Notice: Subject to any disclaimer, the term of this patent is extended or adjusted under 35 U.S.C. 154(b) by 539 days.

(21) Appl. No.: 14/967,626

(22) Filed: Dec. 14, 2015

(65) Prior Publication Data

US 2017/0169156 A1 Jun. 15, 2017

(51) Int. Cl.
*G06F 17/50* (2006.01)

(52) U.S. Cl.
CPC ...... *G06F 17/5072* (2013.01); *G06F 17/5063* (2013.01)

(58) Field of Classification Search
CPC .................. G06F 17/5068–17/5081
See application file for complete search history.

(56) References Cited

U.S. PATENT DOCUMENTS

| 7,093,220 | B2 | 8/2006 | Fallon et al. |
| 7,665,054 | B1 | 2/2010 | Gopalakrishnan et al. |
| 7,877,718 | B2 | 1/2011 | Lin |
| 7,921,391 | B2 | 4/2011 | Weis |
| 8,108,822 | B2 | 1/2012 | Voldman |
| 8,146,042 | B1 | 3/2012 | Wadland et al. |
| 8,234,625 | B2 | 7/2012 | Aberg |
| 8,245,180 | B2 | 8/2012 | Smayling et al. |
| 8,984,465 | B1 | 3/2015 | Salowe |
| 2003/0237069 | A1* | 12/2003 | Mohan ............... G06F 17/5068 716/55 |
| 2008/0120586 | A1* | 5/2008 | Hoerold ............. G06F 17/5068 716/52 |

FOREIGN PATENT DOCUMENTS

WO 2015011514 1/2015

\* cited by examiner

*Primary Examiner* — Vuthe Siek
*Assistant Examiner* — Aric Lin

(57) ABSTRACT

A design tool system includes a schematic design tool that computes a total number of devices in an analog circuit schematic based on information extracted from the analog circuit schematic. The schematic design tool selects an optimal row/column device configuration for the total number of devices and creates a temporary layout based upon the optimal row/column device configuration. The schematic design tool computes layout structure data based on the temporary layout and provides the layout structure data to a place and route tool within the design tool system that, in turn, generates a layout based on the layout structure data The design tool system then generates mask layer data based upon the layout that is configured to generate masks for construction of an integrated circuit corresponding to the analog circuit schematic.

4 Claims, 7 Drawing Sheets

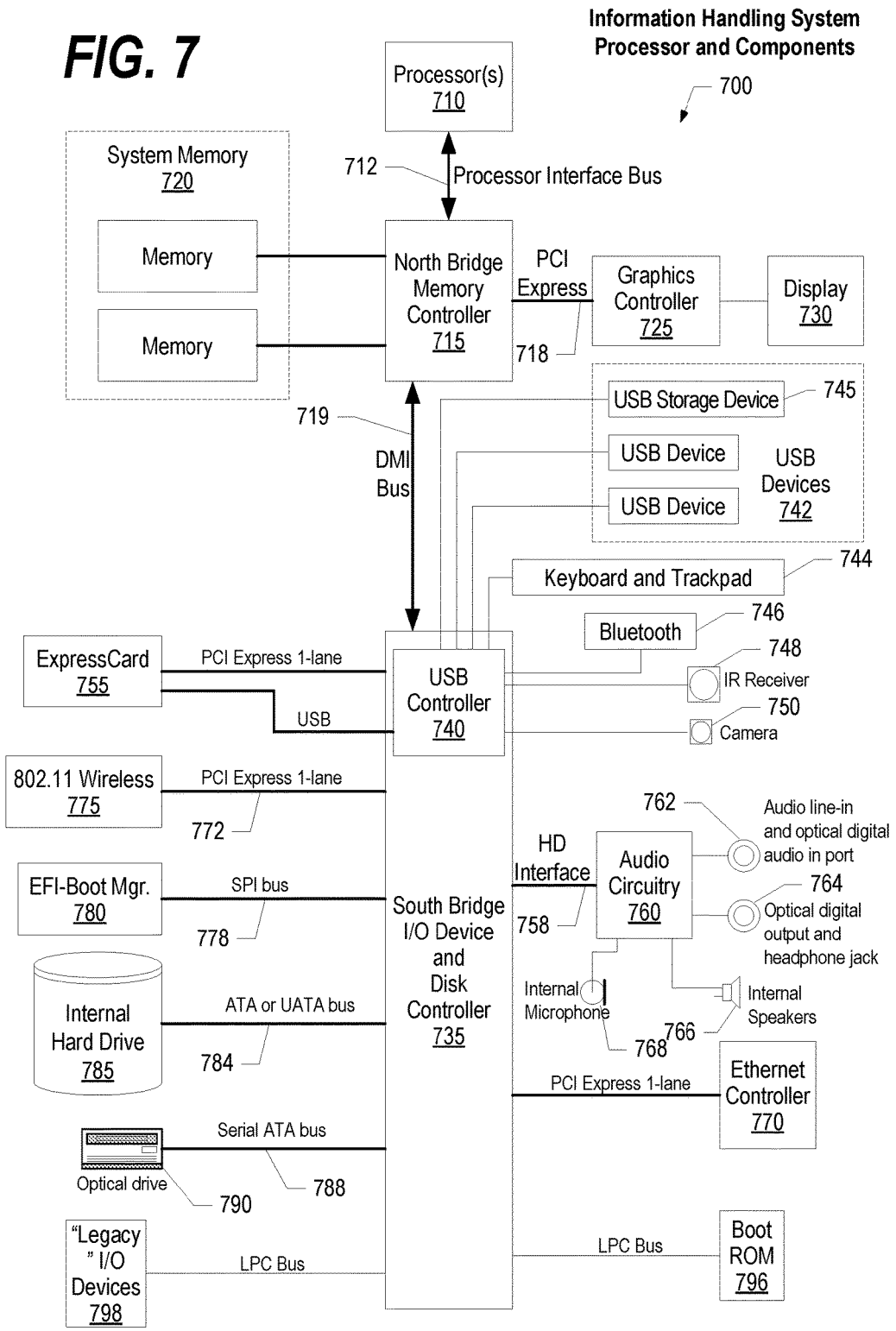

DESIGNING A DENSITY DRIVEN INTEGRATED CIRCUIT

TECHNICAL FIELD

The present disclosure relates to an approach of reducing the number of design layout iterations during an analog circuit development cycle by analyzing density requirements corresponding to process variations of a target technology during a schematic development stage.

BACKGROUND

Designing an analog circuit requires attention to many nuances that are less relevant in digital circuit design. Unlike digital circuits, whose inputs/outputs are either on or off and have built in hysteresis to prevent inadvertent toggling, analog circuits are intentionally designed to respond to minor fluctuations in signal levels. As a result, analog integrated circuit designers, which include analog schematic designers and layout designers, are required to focus on semiconductor device physics such as gain, matching, power dissipation, and resistance.

Analog integrated circuits are also sensitive to process variations, which are further compounded with density requirements in small technology nodes such as 40 nm, 28 nm, and 16 nm. The process variations typically cause process mismatches and lead to an analog integrated circuit not performing as simulated. Layout designers follow physical layout requirements during the layout process to reduce the effects of the process variations of a given technology. Unfortunately, the physical layout requirements are not able to be modeled or simulated and, as such, the exact impact is unknown by an analog schematic designer. As a result, the analog schematic designer provides schematic information, notes, or verbal instructions to a layout designer who typically has to perform several layout iterations before meeting the physical layout requirements of a given target technology.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 7 is a block diagram of a data processing system in which the methods described herein can be implemented.

DETAILED DESCRIPTION

This disclosure describes a density driven methodology for sensitive analog circuits, which addresses process variations in a proactive manner and accelerates layout by reducing design iterations. A schematic level design tool computes a total number of devices corresponding to an analog circuit based upon a number of device symbols extracted from an analog circuit schematic and a number of device symbol instances extracted from the analog circuit schematic. The schematic level design tool selects an optimal row/column device configuration of the total number of devices based upon a calculated row/column ratio, and creates a temporary layout based upon the optimal row/column device configuration. As such, the schematic level design tool determines device spacing information based upon density information extracted from the temporary layout and density requirements of a target technology.

The schematic level design tool also determines an interdigitation pattern of the analog circuit based upon the number of device symbols, the total number of devices, and the number of rows in the optimal row/column configuration. In turn, the schematic level design tool provides the device spacing information, the optimal row/column configuration, and the interdigitation pattern to a place and route tool. The place and route tool generates a layout based on information received from the schematic design tool. Mask layer data is generated from the layout, which is utilized to generate masks for construction of an integrated circuit corresponding to the analog circuit schematic.

Figure 1:
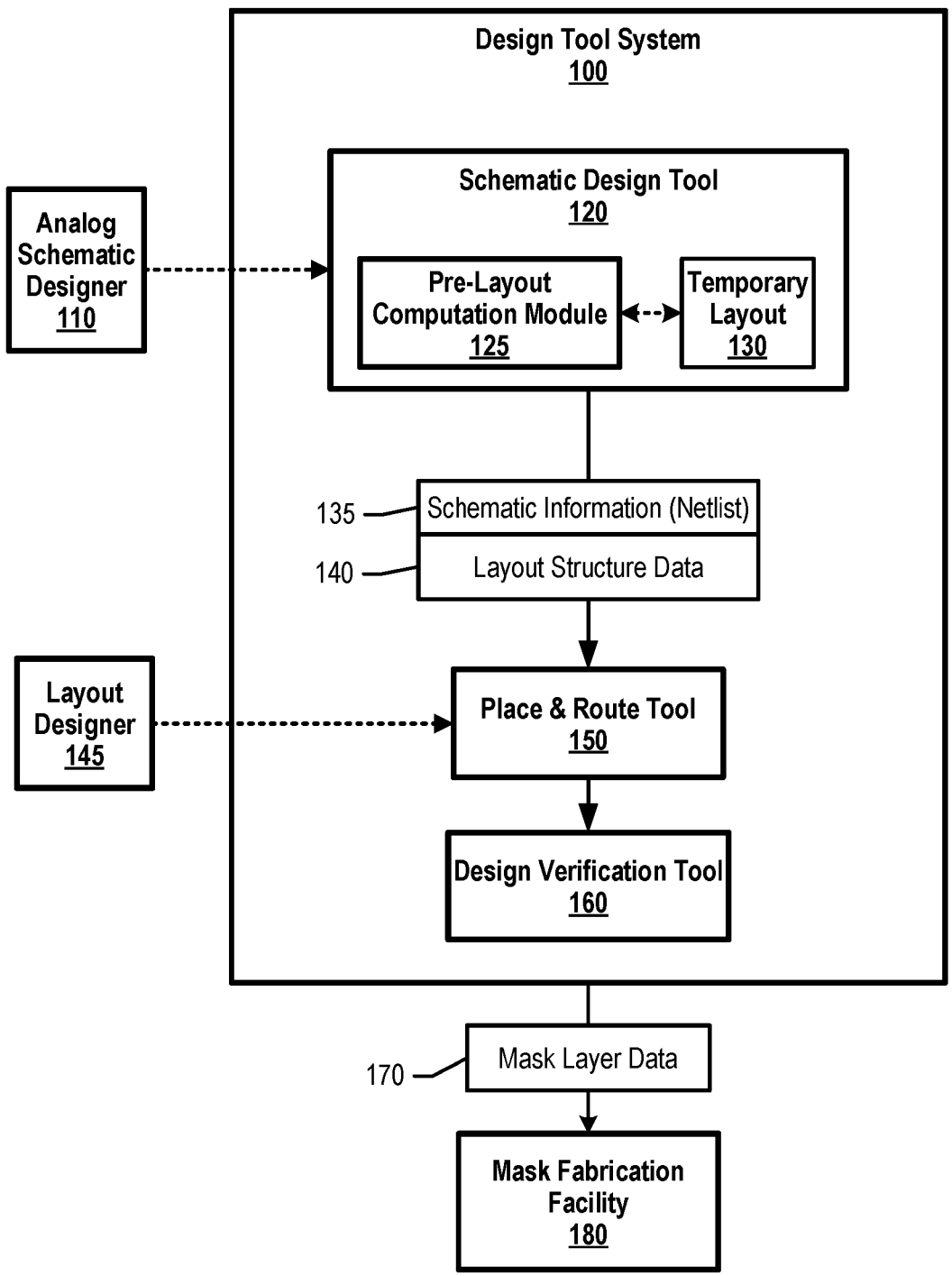
FIG. 1 is a diagram depicting one example of a design tool system that computes layout structure data corresponding to an analog circuit design prior to a place and route stage to increase the probability of producing a successful layout during the place and route stage.

FIG. 1 is a diagram depicting one example of a design tool system that computes layout structure data corresponding to an analog circuit design prior to a place and route stage to increase the probability of producing a successful layout during the place and route stage, in accord with embodiments of the present invention.

Analog schematic designer 110 uses schematic design tool 120 within design tool system 100 to create an analog circuit schematic. Analog schematic designer 110 selects various device symbols, such as device symbols of different types of transistors, and inserts the device symbols into a schematic design.

When analog schematic designer 110 is finished designing the circuit, which results in schematic information 135, pre-layout computation module 125 analyzes schematic information 135 and determines an optimal row/column configuration option based upon the schematic's total number of device symbols and the number of instances of each device symbol. For example, the schematic may include four instances of three different types of transistors and pre-layout computation module 125 determines that a total of 12 devices are in the schematic and determines an optimal row/column configuration for the 12 devices. In one embodiment, the optimal configuration is based upon which configuration has a row/column ratio closest to 1.0 because layouts in a square are typically easier to place on a layout and require less space. Using the example above, possible row/column configurations for the 12 devices could be 1×12, 2×6, 3×4, 4×3, 6×2, and 12×1. In this example, pre-layout computation module 125 selects either the 3×4 row/column configuration or the 4×3 row/column configuration as the optimal row/column configuration.

Pre-layout computation module 125 generates temporary layout 130 based on the determined optimal row/column configuration and taking into account process variations of the target technology, such as compactness. At this point, pre-layout computation module 125 is able to evaluate temporary layout 130 and generate layout structure data pertaining to the physical characteristics of the analog circuit design. This includes computing density information, such as for a poly layer, to determine whether the devices may be abutted or whether the devices need to be spread apart to meet one or more density requirements of a target technology. Pre-payout computation module 125 also selects an interdigitation pattern for the devices based upon the number of device symbols, the total number of devices, and the number of rows in the optimal row/column configuration. See FIGS. 3, 4, and corresponding text for further details.

Once pre-layout computation module 125 includes the optimal row/column configuration, device spacing information, and interdigitation pattern into layout structure data 140, schematic design tool 120 sends schematic information 135 and layout structure data 140 to place and route tool 150.

Layout designer 145 interacts with place and route tool 150 to generate a layout using schematic information 135 and layout structure data 140. Because layout structure data 140 was generated based upon density requirements corresponding process variations of the target technology, place and route tool 150 is not required to perform density DRC (design rules checks) on the layout or perform reiterations of the layout to correct DRC failures.

Design verification module 160 verifies that the layout matches the analog design using techniques such as LVS (Layout versus Schematic) and Constraint Verification. When design verification module 160 determines that the layout passes all tests, design tool system 100 generates mask layer data 170, such as GDS II (Graphic Database System II) data, to send to mask fabrication facility 180. In turn, mask fabrication facility 180 generates masks that are used for construction of a corresponding analog integrated circuit.

Figure 2:
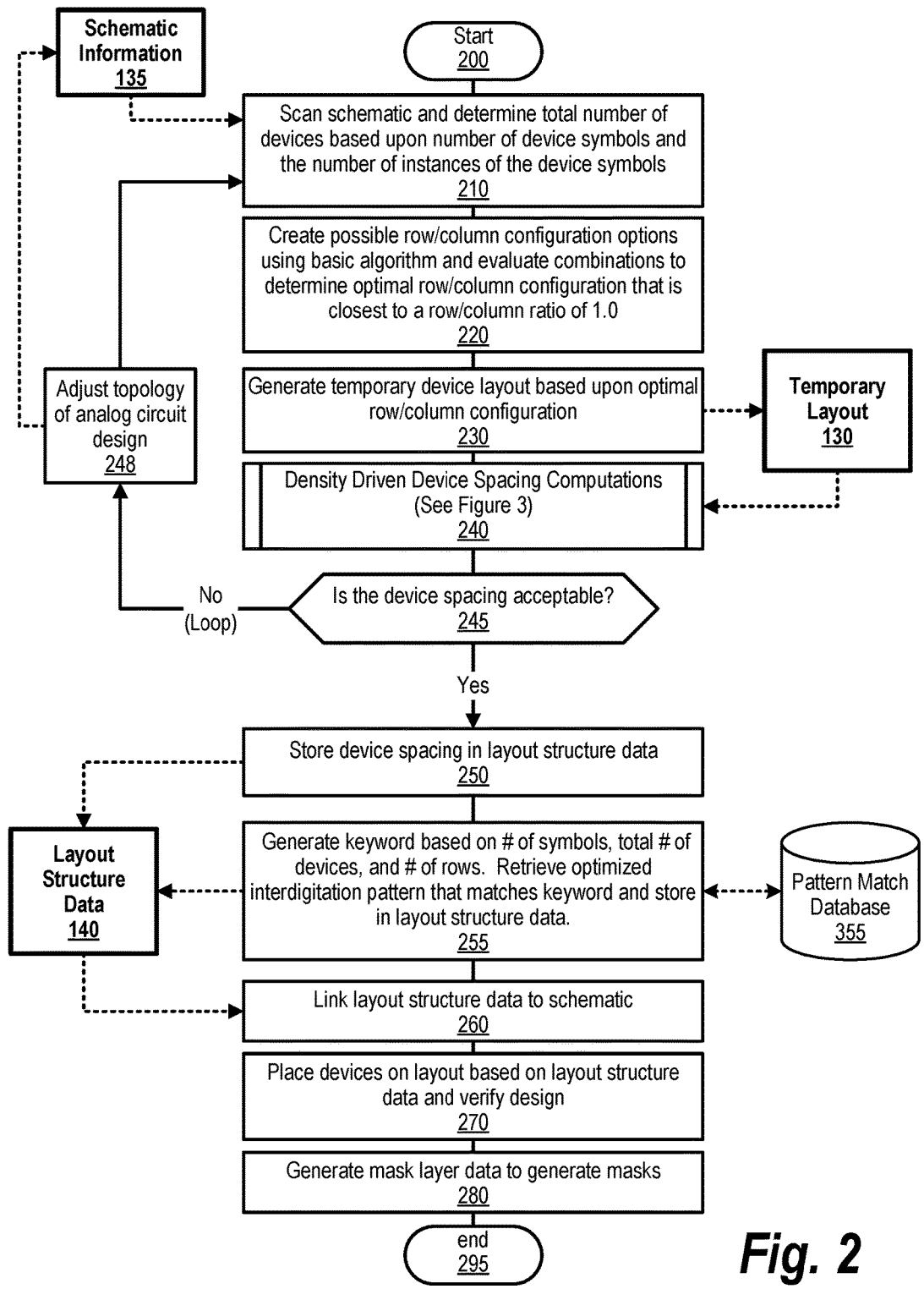
FIG. 2 is a flowchart showing steps taken to generate layout structure data during an analog circuit schematic generation stage and using the layout structure data in a place and route stage to layout an analog integrated circuit.

FIG. 2 is a flowchart showing steps taken to generate layout structure data during an analog circuit schematic generation stage and using the layout structure data in a place and route stage to layout an analog integrated circuit.

Processing commences at 200, whereupon, at 210, the process scans schematic information 135 and determines a total number of devices represented in the schematic based upon the number of device symbols and the number of instances of the device symbols in the schematic. For example, a schematic may have four instances of three different type of transistors, resulting in a total of 12 devices.

At 220, the process creates possible row/column configuration options based upon the total number of devices and evaluates the combinations to determine an optimal configuration that has a row/column ratio that is closest to 1.0. Using the example above, the process may evaluate row/column configurations of 2×6, 3×4, 4×3, and 6×2. In this example, the process selects either the 3×4 configuration or the 4×3 configuration because they have a row/column ratio closest to 1.0. In one embodiment, the process evaluates the options for squareness of the entire selected circuit layout, which varies based on the device and technology. Many of the devices are not square or the default orientation may also impact the squareness of the entire selected circuit layout. Thus, an extra calculation of the device layout size is added to determine the row/column ratio closest to one which is the most ideal layout.

The process, at 230, generates temporary layout 130 based upon the determined optimal row/column configuration. At 240, the process evaluates temporary layout 130 to determine whether to abut the devices or space out the devices based upon density requirements corresponding to process variations of the target technology. See FIG. 3 and corresponding text for further details.

A determination is made as to whether the device spacing is acceptable (decision 245). In one embodiment, the device spacing information is reviewed by analog schematic designer 110 to determine whether the analog circuit will function correctly based on the device spacing information. For example, excess distortion may be introduced into the signals if the devices are spaced too far apart.

If the device spacing is not acceptable, decision 245 branches to the "No" branch, which loops back to 248 where analog schematic designer 110 adjusts the topology of the analog circuit design, such as by changing the types of transistors, the number of device symbol instances, etcetera. In turn, the process scans the new schematic information 135 and proceeds through 210 through 240. This looping continues until the device spacing is acceptable, at which point decision 245 branches to the "Yes" branch.

At 250, the process stores the device spacing information in layout structure data 140. At 255, the process selects an interdigitation pattern for the devices, which is important because the process variations may create mismatches in device performance and cause the circuit to behave differently than simulated, even to a point of failure. The patterns are optimized for compactness, dispersion, and symmetry to counter the process variations based upon, for example, successful historical pattern matching discussed below. In one embodiment, to select an optimum interdigitation pattern, the process generates a keyword that corresponds to the number of device symbols, total number of devices, and the number rows. For example, if the analog circuit layout has four device symbols, 12 total devices, and three rows, the keyword may be "4-12-3." The process, in one embodiment, accesses a pre-generated interdigitation pattern table in pattern match database 355 to retrieve an interdigitation pattern based on the keyword. In this embodiment, the pre-generated interdigitation pattern table may be generated from historical matching of interdigitation patterns to analog circuit layouts. The process stores the corresponding interdigitation pattern information in layout structure data 140.

At 260, the process links layout structure data 140 to schematic information 135, such as by using a constraint system available in EDA (Electronic Design Automation) vendor software. In one embodiment, if an independent software is utilized, pre-layout triggers may be added to facilitate the links to layout. At 270, the process places devices on a layout based on the layout structure data and verifies the design at 270. For example, the orientation of the individual devices, the device-to-device spacing, and the row/column settings are checked by the constraint system, which are typically not verified by a traditional DRC. Instead, a DRC verifies that the layer density is correct by construction.

When the layout is verified, the process generates mask layer data, such as GDSIII data, which is sent to mask fabrication facility 170 to generate masks. Processing ends at 295.

Figure 3:
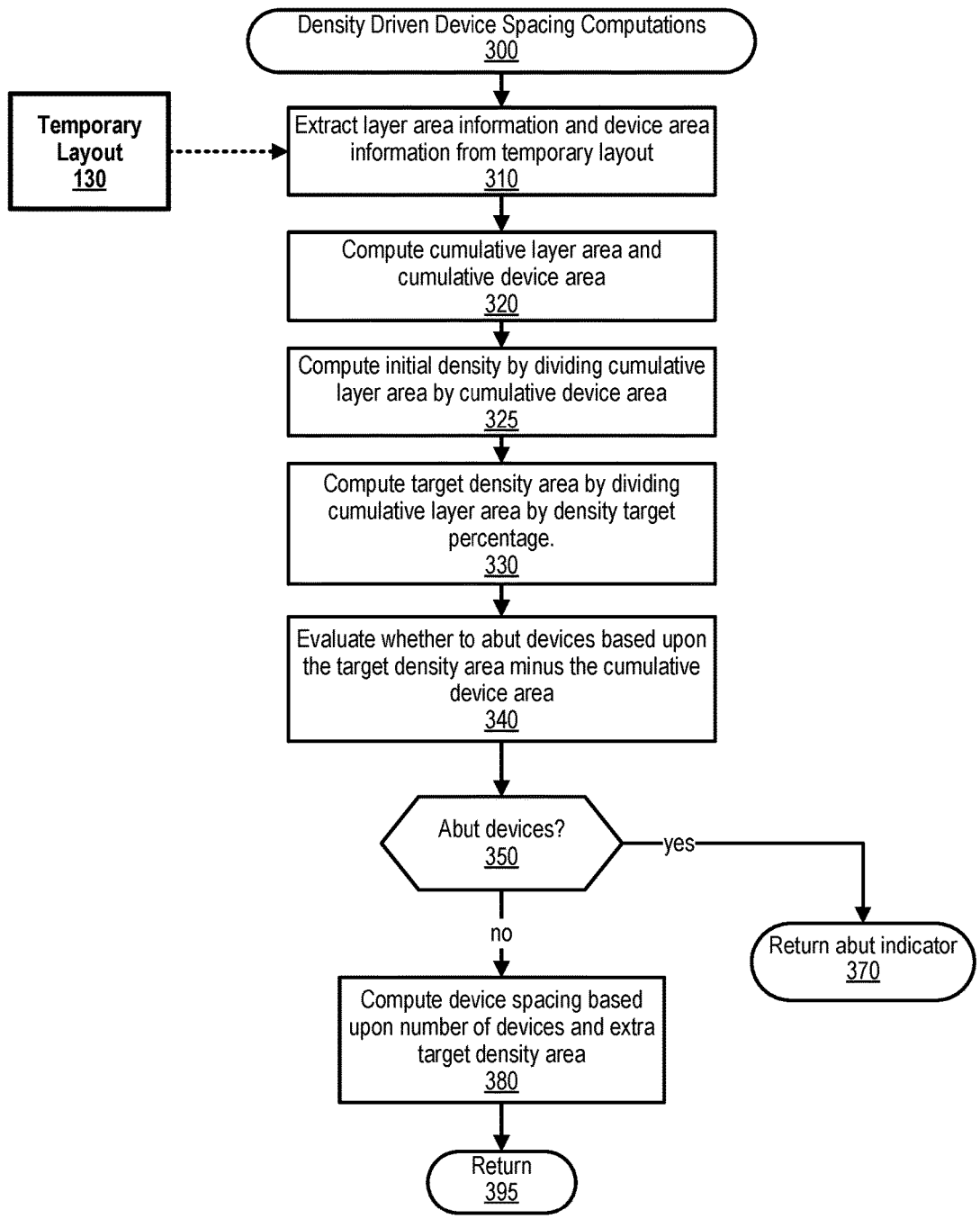
FIG. 3 is a flowchart showing steps to determine whether to abut devices in a layout or add spacing between the devices based upon density requirements of a target technology.

FIG. 3 is a flowchart showing steps to determine whether to abut devices in a layout or add spacing between the devices based upon density requirements of a target technology. FIG. 3 processing commences at 300 whereupon, at 310, the process extracts layer area information and device area information from temporary layout 130. For example, the layer area information may correspond to a poly layer of a device and the device area information corresponds to the entire area of a device. In addition, the process may extract target density information that was entered by the analog schematic designer, such as a target density of 35%.

Figure 5:
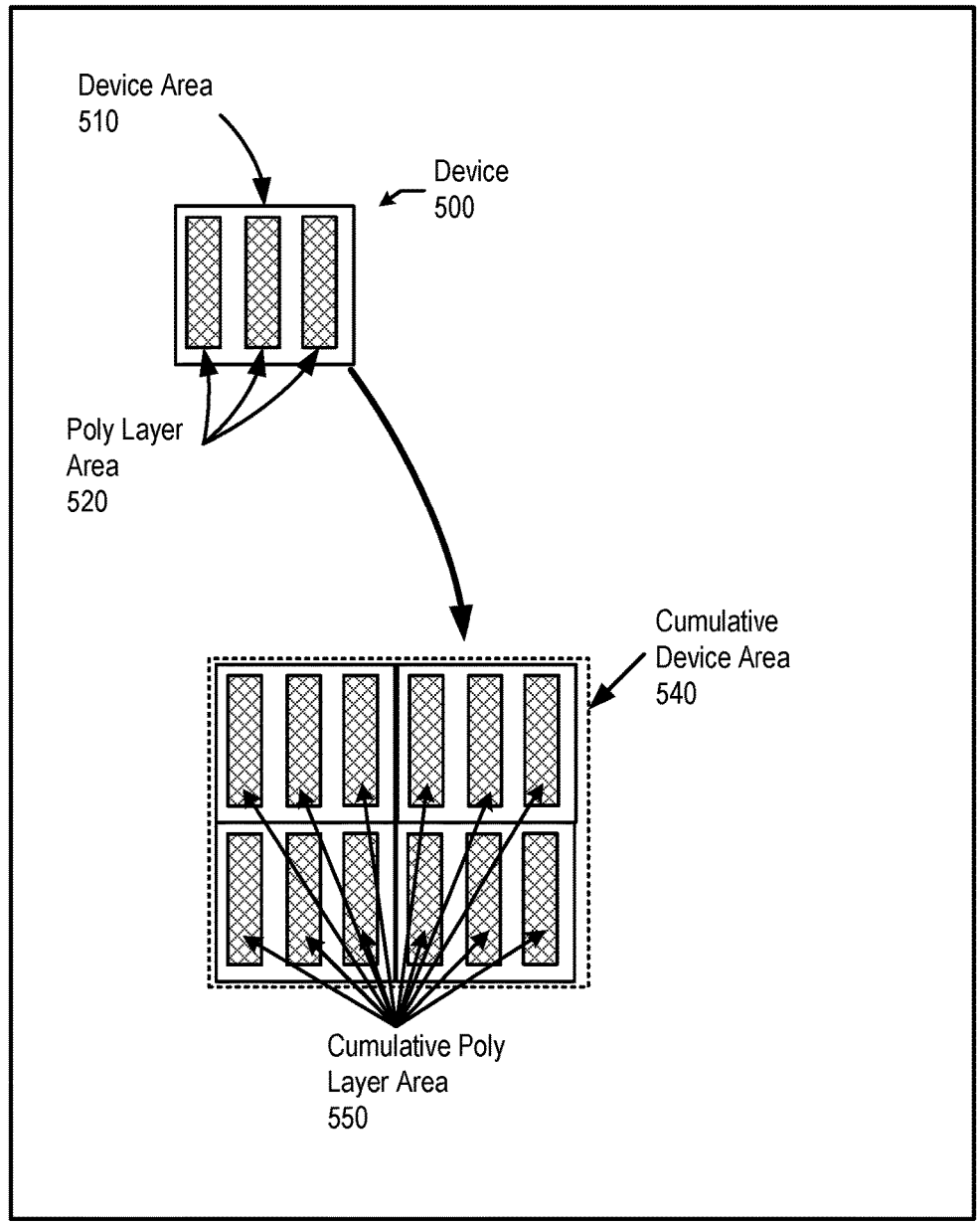
FIG. 5 is a diagram showing an example of device areas relative to poly layer areas.

At 320, the process computes a cumulative device area and a cumulative layer area for a particular layer, such as the poly layer, based upon the layer area information and device area information. FIG. 5 shows graphical representation of the device area, poly layer area, cumulative device area, and cumulative poly area.

At 325, the process computes an initial density by dividing the cumulative layer area by the cumulative device area. For example, the cumulative poly layer area may be 40 square um and the cumulative device area may be 100 square um, in which case the initial density is 40%. In one embodiment, the process reports the initial density to a circuit designer so the circuit designer is aware of the initial density. The information may also used to determine the difference between the initial density and the target density. For example, a designer may use the initial density to gauge similar circuit layouts and estimate how close the initial density of the similar circuits are to the target density value.

At 330, the process computes a target density area by dividing the cumulative layer area by a pre-determined density requirement such as a density target percentage, which may be dictated by the technology utilized to create the integrated circuit. In other words, the target density area is a minimum size of the cumulative device area in order to meet the density target percentage. For example, in one target technology the target density may range from 25% to 45%, but change to 35% to 55% in a different target technology. In addition, the density target percentage may be different at different layers within the same target technology.

At 340, the process evaluates whether to abut the devices based upon the difference between the target density area and the cumulative device area. For example, if the analog schematic designer entered a target density of 35% but the preliminary estimate shows that the default placement is at 30% from 330 above, then the devices maybe abutted without concern for exceeding the target density. However, if the preliminary estimate is over 35% then the devices are not abutted, but instead a device-to-device spacing is determined to increase the density value discussed in more detail.

The process determines whether to abut the devices based on the evaluation results from 340 (decision 350). If the process should abut the devices, then decision 350 branches to the 'yes' branch, whereupon the process returns an abut indicator at 370 to the calling routine FIG. 2 at 370.

On the other hand, if the process should not abut the devices to meet density requirements, then decision 350 branches to the 'no' branch. At 380, the process computes a device spacing based upon the number of devices and the extra target density area. For example, if the target density is 55% but the estimated density value is greater, such as 70% then the device to device spacing must be increased. The calculation takes into account the entire device area and the row/column configuration. The calculated device-to-device spacing is placed in a constraint mechanism or a pre-layout trigger to ensure correct by construction layout results. FIG. 3 processing thereafter returns to the calling routine FIG. 2 at 395.

Figure 4:
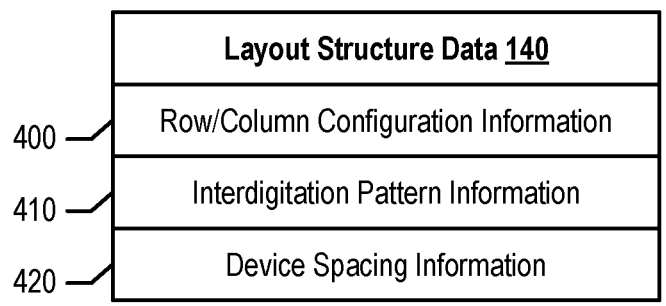
FIG. 4 is a diagram showing an example of layout structure data properties.

FIG. 4 is a diagram showing an example of layout structure data properties. Layout structure data 140 includes row and column configuration information 400 based upon the optimal row/column configuration that was determined at 220 in FIG. 2, such as a 3×4 row/column configuration. Layout structure data 140 also includes interdigitation pattern information 410, which was determined at 250 in FIG. 2. For example, if there are two device symbols, with 8 instances total, the number of rows is 2, the number of columns is 4, the pattern is BAAB on the top row, the bottom row has ABBA, and the orientation is R0 for each device to minimize process variations inherent in the processing of integrated circuits. Layout structure data 140 also includes device spacing information 420, which was determined at 370 or 380 in FIG. 3 and may include spacing information or an abut indicator as discussed above.

FIG. 5 is a diagram showing an example of device areas relative to poly layer areas. Device 500 encompasses device area 510. For example, device area 510 may be 10 um×10 um, or 100 sq. um. Poly layer area 520 consists of three separate poly areas within device area 510. For example, each of the poly areas may be 8 um×2 um, or 16 um, giving a poly layer area of 48 sq. um for device 500. As such, the poly layer density for device 500 is computed as 48/100, or 48%.

Cumulative device area 540 includes four of devices 500. Based on the example above, the cumulative device area would be 100 sq. um×4=400 sq. um, and the cumulative poly layer area is 48 sq. um×4=192 sq. um. As such, the initial density for cumulative device area 540, which is computed in 325 in FIG. 3, is 192/400, or 48% If the desired density was 35% then the device to device spacing, 4 segments in this example, is calculated to meet the target. The poly area divided by the actual target is subtracted from the total device area. This value is used to determine the device-to-device spacing as described in steps 325, 330, 340, 350, 380, and 390. Based upon the density target percentage of the target technology, pre-layout system module 130 determines whether devices 500 may stay abutted as shown in FIG. 5 or whether devices 500 should be spread apart. See FIG. 3's steps 330, 340, and corresponding text for further details.

Figure 6:
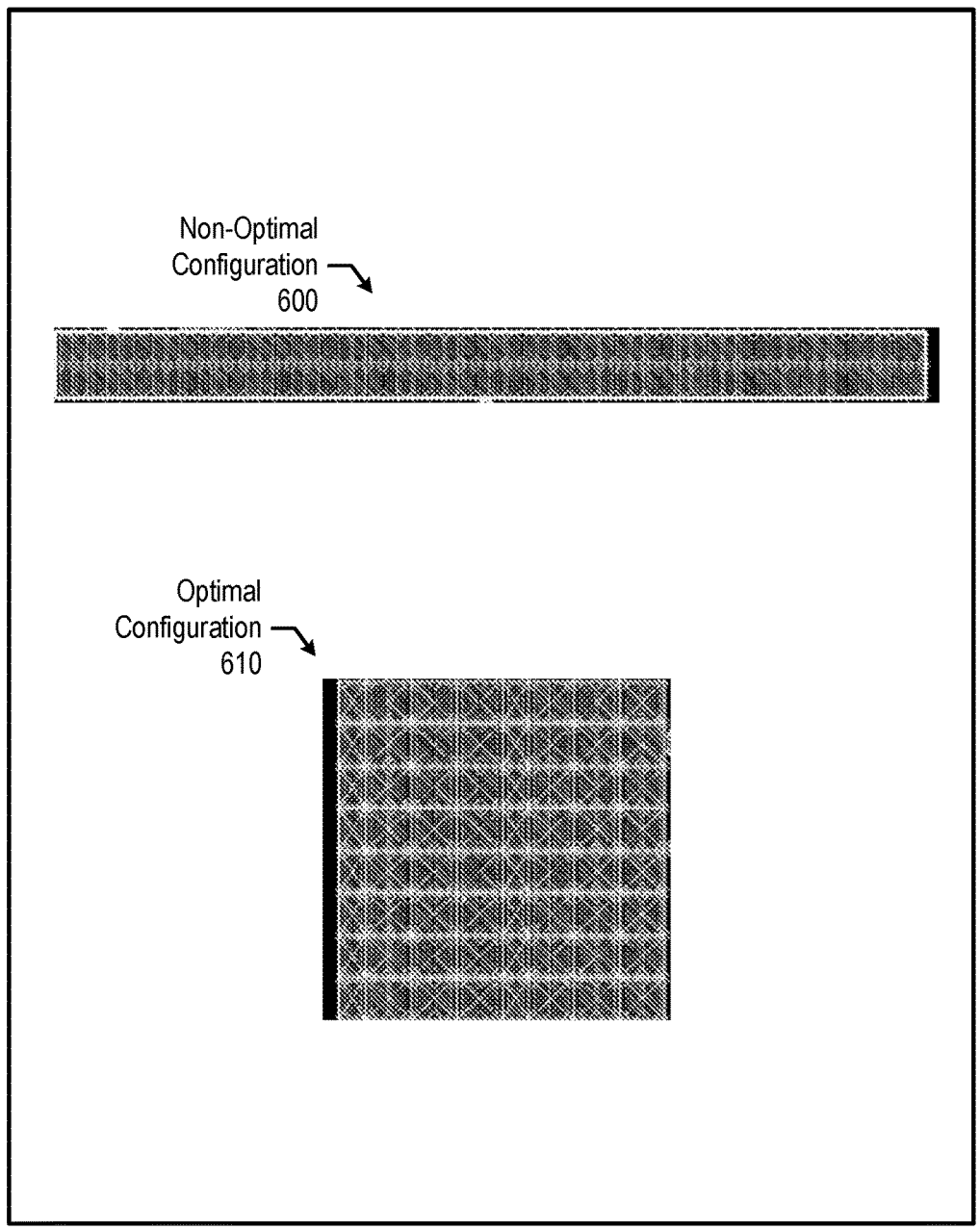
FIG. 6 is a diagram depicting examples of a non-optimal row/column configuration and an optimal row/column configuration.

FIG. 6 is a diagram depicting examples of a non-optimal row/column configuration and an optimal row/column configuration. Non-optimal row/column configuration 600 and optimal configuration 610 include the same number of devices. However, non-optimal row/column configuration 600 is rectangular in nature whereas optimal row/column configuration 610 is square in nature. As such, optimal row/column configuration 610 is less susceptible to process variations on a silicon die because it encompasses a more compact area on the silicon die compared to non-optimal row/column configuration 610, which spreads across the silicon die, subjecting itself to more process variations.

According to one embodiment of the present invention, a schematic design tool computes a set of layout structure data corresponding to an analog circuit schematic. The layout structure data includes device spacing information corresponding to density requirements of a target technology. The schematic design tool provides the set of layout structure data and the analog circuit schematic to a place and route tool, which generates a layout based upon the layout structure data and the analog circuit schematic. In turn, mask layer data is generated based upon the layout, which is configured to generate a plurality of masks for construction of an analog integrated circuit using the target technology and corresponding to the analog circuit schematic.

According to another embodiment of the present invention, prior to the computing of the layout structure data, the schematic design tool extracts device information from the analog circuit schematic that includes device symbols and device symbol instance amounts. The schematic design tool determines a total amount of devices that correspond to the analog circuit schematic based upon the extracted device information, and selects an optimal row/column configuration for the devices that has a row/column ratio closest to 1.0. In turn, the schematic design tool creates a temporary layout based upon the optimal row/column configuration.

According to another embodiment of the present invention, the schematic design tool extracts layer area information and device area information from the temporary layout, and computes a cumulative layer area and a computing a cumulative device area accordingly. The schematic design tool generates the device spacing information based upon the cumulative layer area, the cumulative device area, and the density requirements of the target technology.

According to another embodiment of the present invention, the schematic design tool selects an interdigitation pattern based upon a number of the device symbols, a number of the devices, and the optimal row/column configuration. The schematic design tool then adds the interdigitation pattern and the optimal row/column configuration to the layout structure data that is provided to the place and route tool.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, a software embodiment (including firmware, resident software, micro-code, etc.), including processing circuitry for executing thereof, or an embodiment combining software and hardware aspects that may all generally be referred to herein as a "circuit," "module" or "system."

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

FIG. 7 illustrates information handling system 700, which is a simplified example of design tool system 100 that is capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. Other components often included in Southbridge 735 include a Direct Memory Access (DMA) controller, a Programmable Interrupt Controller (PIC), and a storage device controller, which connects Southbridge 735 to non-volatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. An analog integrated circuit made by a method comprising:
   determining, by a schematic design tool, a set of layout structure data corresponding to an analog circuit schematic, wherein the layout structure data comprises device spacing information corresponding to one or more density requirements of a target technology;
   providing the set of layout structure data and the analog circuit schematic to a place and route tool;
   generating a layout, by the place and route tool, based upon the layout structure data and the analog circuit schematic; and
   generating mask layer data based upon the layout, wherein the mask layer data is configured to generate a plurality of masks for construction of the analog integrated circuit using the target technology and corresponding to the analog circuit schematic;
   wherein, prior to the determining of the layout structure data, the method further comprises:
     extracting, by a design tool system, device information from the analog circuit schematic that includes one or more device symbols and one more device symbol instance amounts;
     determining, by the design tool system, a plurality of devices that correspond to the analog circuit schematic based upon the extracted device information;
     selecting, by the design tool system, from a plurality of row/column configurations, an optimal row/column configuration for the plurality of devices that has a row/column ratio closest to 1.0; and
     creating, by the design tool system, a temporary layout based upon the optimal row/column configuration;
     extracting, by the design tool system, layer area information and device area information from the temporary layout;
     determining, by the design tool system, a cumulative layer area from the extracted layer area information and determining a cumulative device area from the extracted device area information; and
     generating, by the design tool system, the device spacing information based upon the cumulative layer area, the cumulative device area, and the one or more density requirements of the target technology;
   wherein the device spacing information comprises information to abut the plurality of devices in the layout.

2. The integrated circuit of claim 1 wherein the method further comprises:
   selecting, by the design tool system, an interdigitation pattern, from a plurality of interdigitation patterns, based upon a number of the one or more device symbols, a number of the plurality of devices, and the optimal row/column configuration; and
   adding, by the design tool system, the interdigitation pattern and the optimal row/column configuration to the layout structure data that is provided to the place and route tool.

3. The integrated circuit of claim 2 wherein the method further comprises:
   generating, by the design tool system, a keyword based upon the number of the one or more device symbols, the number of the plurality of devices, and a number of rows in the optimal row/column configuration;

locating, by the design tool system, a table entry in an interdigitation pattern table that comprises the keyword, wherein the interdigitation pattern table comprises the plurality of interdigitation patterns; and retrieving, by the design tool system, the interdigitation pattern from the located table entry.

4. The integrated circuit of claim 1 wherein, prior to providing the set of layout structure data to the place and route tool, the method further comprises:

providing, by the schematic design tool, the device spacing information to an analog schematic designer; and receiving one or more topology adjustments from the analog schematic designer that adjusts one or more device symbols in the analog circuit schematic.

\* \* \* \* \*